Figure 6:
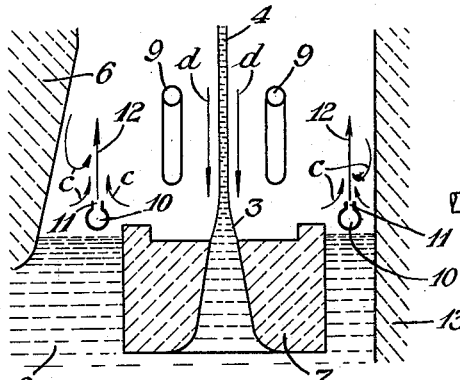

Nov. 2, 1954  E. BRICHARD  2,693,052
PROCESS OF AND APPARATUS FOR DRAWING GLASS
Filed Aug. 4, 1949  2 Sheets-Sheet 1
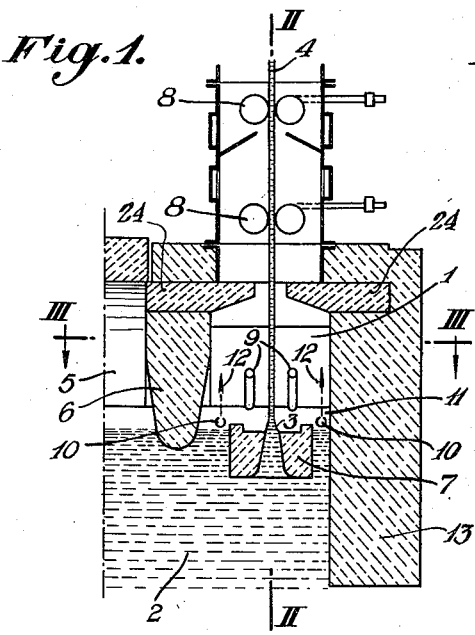
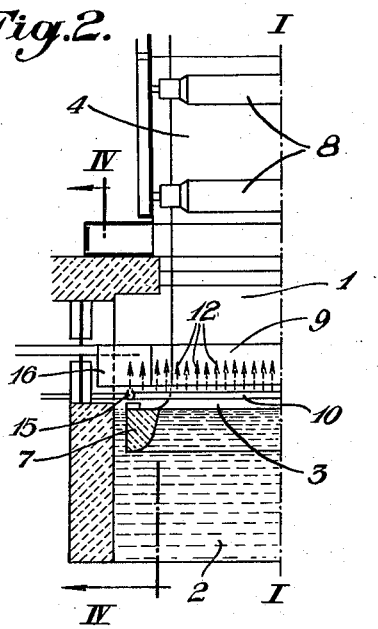
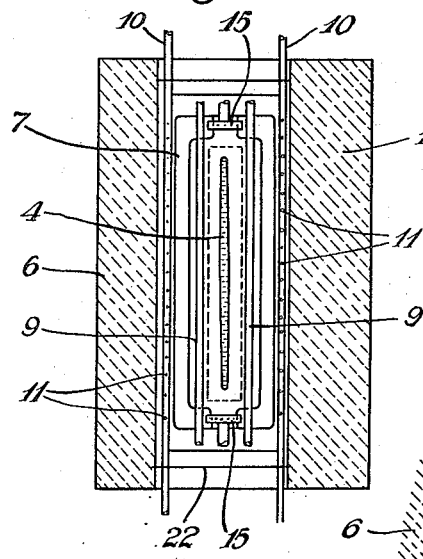
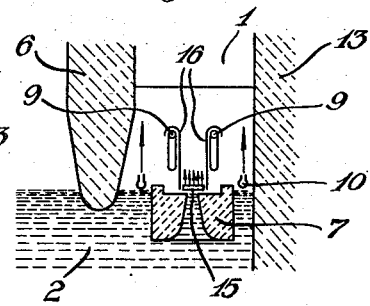
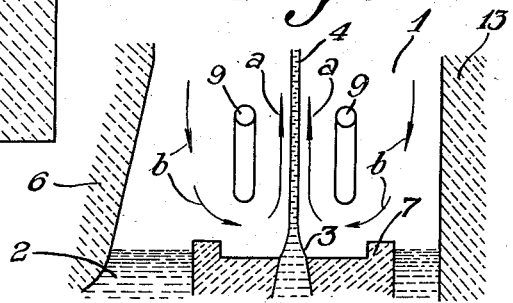
INVENTOR
Edgard Brichard
By
ATTORNEY Nov. 2, 1954     E. BRICHARD     2,693,052

PROCESS OF AND APPARATUS FOR DRAWING GLASS

Filed Aug. 4, 1949     2 Sheets-Sheet 2

INVENTOR
Edgard Brichard
By George H. Corey
ATTORNEY

United States Patent Office 2,693,052
Patented Nov. 2, 1954

2,693,052

PROCESS OF AND APPARATUS FOR DRAWING GLASS

Edgard Brichard, Jumet, Belgium, assignor to Union des Verreries Mecaniques Belges S. A., Charleroi, Belgium, a Belgian company Application August 4, 1949, Serial No. 108,452

Claims priority, application Belgium May 17, 1949

10 Claims. (Cl. 49—17)

This invention relates to the drawing of glass in sheet form and is concerned with the provision of a process and an apparatus for producing drawn glass of generally improved appearance. It has been found that any movement of cold air along the still plastic surface of the glass, in the neighbourhood of the bulb, that is to say at the point at which the sheet is formed, produces modifications in the characteristics of the glass, as a result of which the surface of the glass is impaired. A zone of reduced pressure does, however, tend to form at the foot of the drawn glass owing to the fact that the air which is heated in contact therewith rises along the two faces of the sheet. As a result of this, cold air flows towards the bulb on the one hand from the upper part of the drawing chamber and on the other hand from the outside through the orifices in the chamber, which cannot be entirely plugged. Due to a thermosiphoning effect, the said cold air tends to travel towards the bulb and to rise in a thin layer along the sheet which is being drawn, on which it produces harmful effects consisting in particular of striations.

Endeavours have been made to deflect these harmful cold air currents by producing other currents whose effect on the sheet is less harmful, but the results of such measures are always imperfect, since currents of air always remain in the neighbourhood of the bulb. An effort has also been made to protect the sheet from the harmful currents by means of barriers, but for operational reasons, it is impossible to make such barriers continuous, with the result that the influx of air is concentrated at the gaps in the barrier, the harmful effects thus being increased at these points.

The object of the present invention is to overcome this disadvantage and to prevent harmful currents of air from being set up in the neighbourhood of the bulb by balancing the pressure around all or part of the periphery of the bulb, in the lower part of the chamber in which the drawing is carried out. For this purpose, there is created, in a zone of the drawing chamber which is situated at a level at which the glass is still plastic, a reduction in pressure relative to the pressure obtaining against the sheet at the said level. A draught is thus set up, which balances that which is created by the sheet at high temperature and which draws away from the foot of the sheet the cold currents which tend to travel in the direction thereof.

The pressure-reduction in the vicinity of the bulb may be created by any suitable means, for example with the aid of a tube or other hollow member communicating with a suction pump, or by creating a local increase in temperature in order to cause the highly heated air to rise, or again by the means hereinafter described. Preferably, use is made of tubes having orifices formed therein, through which jets of air under pressure, or of gas, escape upwardly or towards the walls of the chamber at a sufficient distance from the sheet and in such a direction as not to affect the temperature of the sheet.

A number of forms of embodiment of the invention are illustrated by way of example in the accompanying drawings, in which:

Figures 1 to 4 show diagrammatically, a drawing tank installation to which the invention is applied, Figure 1 being a vertical section on the line I—I of Figure 2 with the screen 16 of Fig. 2 omitted, Figure 2 a vertical half-section on the line II—II of Figure 1, Figure 3 a horizontal section on the line III—III of Figure 1, and Figure 4 a vertical section on the line IV—IV of Figure 2, Figures 5, 6 and 7 are sections similar to those of Figure 1 but on a larger scale, showing the circulation of the gaseous currents in a furnace of normal construction (Fig. 5) and in two furnaces provided with means according to the invention (Figs. 6 and 7), and Figures 8, 9, 10, 11, 12 and 13 show diagrammatically various arrangements of blowing tubes which can be employed in carrying the invention into effect.

In the drawings, 1 designates the chamber of a vertical drawing tank insulated from the atmosphere of the furnace 5 by a partition 6 of refractory material. The glass sheet 4 is formed from the glass bath 2 through a forming bulb 3 bounded by a frame or block 7 of refractory material. The sheet 4 passes between cooling tubes 9 and is drawn between the rollers 8.

In the existing practice, the principal currents are set up in the drawing chamber as shown in Figure 5. The sheet, which is at high temperature in a relatively cold atmosphere, induces rising currents $a$ along its faces, thus causing a pressure-reduction in the neighbourhood of the forming bulb. This pressure-reduction sets up convection currents of relatively cold air $b$ flowing either downwardly from the upper part of the chamber and being more or less cooled as they travel along the walls of the chamber, or from the outside and passing through access apertures which in practice can never be completely eliminated. These currents $b$ therefore bring relatively cold air into contact with the sheet in the zone in which the glass is still plastic and give rise to the disadvantages hereinbefore mentioned.

Figure 13:
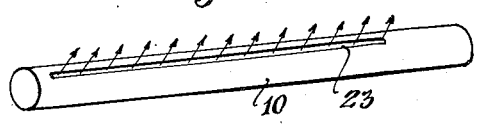

In the embodiment shown in Figures 1 to 4, there are located in the lower part of the chamber 1, preferably near the level of the bulb, two pipes 10 having closely spaced holes 11 through which the hot or cold air under pressure, or flames, can escape. The pressure inside the pipes 10 must be higher than the surrounding pressure, so that the gases escape through the orifices 11 at a certain velocity. The temperature of the gas blown in may be previously raised, or combustible gases may be blown in which are ignited, thus setting up a draft flow of hot gases. The orifices 11 can obviously be replaced by a narrow longitudinal slot 23, as shown in Fig. 13, which then produces a thin layer of gas instead of a series of closely spaced jets.

The orifices 11, or the slots 23, as the case may be, are so directed that the jets or the layer of gas leaving them cannot come into contact with the sheet, but are directed either towards the walls 6 and 13 of the chamber 1 or towards the cooling members 9, or again towards refractory elements 24 forming part of the equipment of the drawing tank.

In this way, a series of parallel jets directed as shown in chain lines at 12 in Figures 1 and 2 is obtained.

It has been found that under these conditions, the gases leaving the pipes 10 carry with them the neighbouring air and set up a reduced-pressure zone around the pipes 10 owing to their momentum or owing to their temperature, or owing to a combination of these two factors. This pressure-reduction can be regulated as a function of the blowing pressure, the dimensions and number of the orifices, the temperature of the gases and the nature thereof if they are combustible. The form of the reduced-pressure zone can also be regulated by varying the direction of the jets of ejected air, the temperature of the ejected gases and the position of the blowing means. It has been found that, by such regulation, it is possible to balance the pressure between that zone of the drawing chamber which is close to the forming bulb of the sheet on the one hand and the remainder of the chamber situated at the same level, in which the air is relatively cold, on the other hand. It is even possible to increase the pressure-reduction around the pipes 10 to such an extent as to reverse the pressure ratio, so that the pressure of the hot air in the neighbourhood of the foot of the sheet is greater than that of the cold air at the same level at a point further from the said foot of the sheet. Under these conditions, the air currents are reversed, that is to say, instead of cold air rising along the sheet and thus becoming heated, hot air is caused to descend along the sheet and is then discharged towards the colder zones of the chamber.

These novel conditions are shown in Figure 6. The gas jets 12 leaving the pipes 10 cause a reduction in pressure along the said pipes, which is adjusted in order to balance the pressure-reduction which tends to occur at the foot of the sheet. This results in a draught towards the pipes 10 and the formation of currents c coming either from the outside or from the vicinity of the bulb. Thus, the currents a are eliminated, and, as has already been stated, it is even possible by increasing the pressure reduction along the pipes 10 to set up currents descending along the sheet, as indicated by the arrows d. The movement of hot air along the sheet does not in any way impair the surface of the sheet.

The arrangement hereinbefore described can advantageously be completed by providing two pipes 15 at the extremities of the chamber 1, at the same level as the pipes 10, in the manner shown in Figures 2 to 4, so as to create at the ends of the chamber opposite the edges of the sheet the same condition of upwardly directed gas jets as is obtained along the sides of the chamber with the aid of the pipes 10. There is thus created in proximity to the pipes 15 a pressure-reduction which, due to the effect hereinbefore described, prevents the currents of the gaseous atmosphere present in the chamber from travelling inwardly towards the point of formation of the edge of the sheet and along the faces of the sheet.

In order that the air movements created, induced or already existing may not influence the sheet, it may be desirable to separate the blowing devices from the sheet either by existing means such as the cooling pipes or by special means. Thus, screens 16 such as those shown in Figures 2 and 4 may be secured to the cooling pipes 9. The said screens constitute an extension of the passage formed by the cooling pipes 9, so as to limit as far as possible any possibility of disturbance on the sheet due to the effect of the end pipes 15, while preserving a margin for spacing the said end tubes from the edge of the sheet. The pressure-reduction created with the aid of the said pipes is transmitted to the vicinity of the bulb through the passage which is thus extended.

If combustible gas is introduced into the pipes 10 and ignited within the chamber, that is to say as it leaves the orifices 11, the flames produce a local increase in the temperature of the air and set up at this point a draught which can be so regulated as to balance the draught that tends to be set up by the sheet.

The introduction of air under pressure into the pipes 10 can, in this case, be effected in various ways. The simplest method consists in connecting the said pipes to a compressed-air reservoir. The said air is preferably heated before being introduced into the pipes 10 so as to avoid the harmful effect resulting from the introduction of cold air into the drawing chamber.

Figure 8:
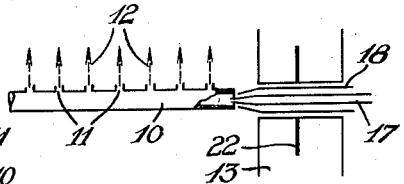
Figure 7:
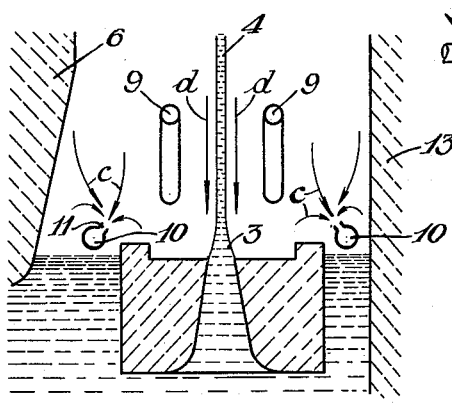
Figure 9:
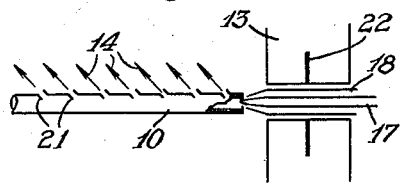

If no hot air under pressure is available, it is possible, as shown in Figures 8 and 9, to dispose, at the end of the pipe 10, a pipe 17 which is narrowed at its end and is enclosed within a second pipe 18. The cold air under pressure arrives through the pipe 17 and combustible gas is introduced through the pipe 18. Owing to the form of the pipe 17 and the introduction of the air under pressure an induction effect is set up causing the gas supplied through the pipe 18 as well as portions of the gaseous atmosphere in the chamber 1 immediately surrounding the end of pipe 10 to be drawn into the pipe 10 and mixed therein with the air introduced through the pipe 17. Although the combustible gas and the air introduced through the pipe 17 may be supplied in the cold state the resulting mixture becomes quickly heated to the point where combustion will take place. Combustion begun at the entrance to the pipe 10 will continue within the pipe and may be completed therein or after the gases discharge through the orifices 11 into the drawing chamber, depending upon the air pressure and the relative proportions of the gas and air supplied to the pipe 10. The precise point at which combustion is initiated or finished is immaterial since the purpose of burning combustible gases supplied to the pipe 10 is to provide hot gases that may be discharged through the orifices 11 to promote the desired directional flow of currents of the gaseous atmosphere present in the drawing chamber.

Figure 10:
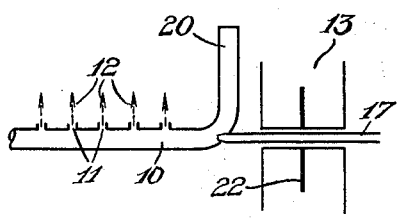

The admission pipes can also be arranged as shown in Figure 10, the pipe 10 being extended by a vertical portion whose extremity 20 is situated at a level in the drawing tank at which the ambient air is relatively hot. The air under pressure introduced through the pipe 17 produces the same induction effect as is shown in Figures 8 and 9 and sets up a draught of hot air from the chamber.

Instead of being directed perpendicularly to the longitudinal axis of the bulb, the air or gas jets can be directed obliquely with respect to the said axis. For this purpose, it is sufficient to make the holes obliquely or to form oblique nozzles 21 therein (Figure 9), the jets under pressure then following the direction indicated by the chain lines 14. In this way, a component of the gaseous currents is created, which is directed towards the extremities of the sheet of glass.

Figure 11:
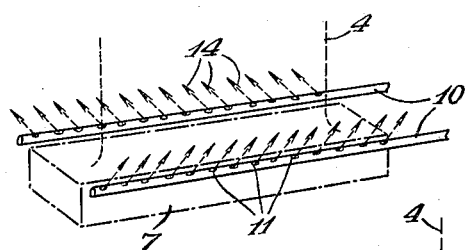

This procedure neutralises the currents of air which generally emanate from the end closing doors 22 of the drawing chamber and which cool the bulb at its extremities, that is to say, at the points at which the edges are formed. A means of improving the quality of the edges of the sheet is thus provided. If the two pipes 10 situated on either side of the sheet have orifices 11 such that the currents 14 are oppositely directed as shown in Figure 11, a movement of the air around the sheet in a generally helical path is created. Apart from affording the aforesaid advantages, this arrangement provides a uniformity of the air throughout the chamber in which the drawing takes place.

Figure 12:
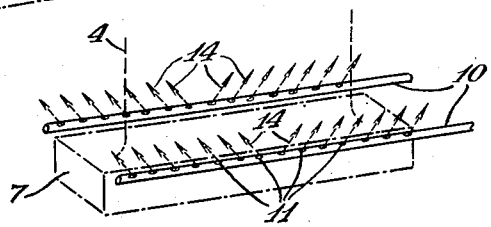

The oblique jets 14 can also have the general disposition shown in Figure 12, the jets being differently directed in each half of the pipes 10, so that the jets of one half are directed towards the nearer extremity of the chamber. In this way also, any undesirable longitudinal currents which might be set up in the drawing chamber are compensated for.

Further modification can obviously be made in the arrangements described without departing from the scope of the invention.

I claim:
1. A process for the vertical drawing of glass in sheet form from a heated bath of molten glass, including the steps of drawing the glass up from the surface of the bath through a cooled drawing chamber immediately above said bath, while injecting gaseous currents upwardly within said drawing chamber at points just above the bath surface and spaced from the base of the glass sheet, said currents being effective to reduce the pressure in an outer zone adjacent said points below the pressure in an inner zone immediately adjacent the base of the sheet, said zones being in open communication so that the difference in the pressures tends to produce air currents flowing from the inner zone toward the outer zone.

2. A process for drawing glass as defined in claim 1 in which said gaseous currents comprise a combustible gas.

3. A process for drawing glass as defined in claim 1 in which said gaseous currents are directed in the form of a pair of streams parallel to the sheet and respectively spaced from the opposite sides thereof, said streams extending across the entire width of the sheet.

4. A process for drawing glass as defined in claim 3 in which one of said streams is directed at an angle with respect to the vertical toward one end of the chamber and the other said stream is directed at an angle toward the opposite end of said chamber.

5. A process for the vertical drawing of glass in sheet form from a heated bath of molten glass, including the steps of drawing the glass up from the surface of the bath through a cooled drawing chamber immediately above said bath, while injecting gaseous currents upwardly within said drawing chamber at points just above the bath surface and spaced from the base of the glass sheet, said currents being effective to maintain the pressure in an outer zone adjacent said points as least as low as the pressure in an inner zone immediately adjacent the base of the sheet to prevent air currents flowing toward the inner zone from the outer zone which are in open communication.

6. A process for the vertical drawing of glass in sheet form from a heated bath of molten glass, including the steps of drawing the glass up through a sheet-forming block located at the surface of the bath and further drawing the sheeted glass through a cooled drawing chamber immediately above said block while injecting gaseous currents into said drawing chamber at points just above the bath surface and spaced from the base of the glass sheet, said currents being injected in the form of a pair of side streams directed upwardly along paths parallel to and respectively spaced from the opposite sides of said sheet and a pair of upwardly directed end streams perpendicular to said side streams and respectively spaced from the opposite ends of said sheet, said streams being effective to reduce the pressure in an outer zone adjacent said points below the pressure in an inner zone immediately adjacent the base of the sheet, said zones being in open communication so that the difference in pressure tends to produce air currents flowing away from said inner zone toward said outer zone.

7. Apparatus for drawing glass in sheet form from a heated bath of molten glass comprising a drawing chamber immediately above the bath surface, means for drawing said glass sheet upwardly through said drawing chamber, a pair of pipes within said chamber extending parallel to said sheet on the opposite sides thereof respectively and spaced therefrom just above the bath surface, said pipes having apertures formed in their upper sides, and means for supplying gas to said pipes under pressure higher than that in the chamber so as to produce upwardly directed jets of gas through said apertures thereby creating an outer zone about said pipes of low pressure relative to an inner zone immediately adjacent said glass sheet at the same level, said zones being in open communication so that the difference in pressure tends to produce air currents flowing from said inner zone to said outer zone.

8. Apparatus for drawing glass in sheet form from a heated bath of molten glass, comprising a drawing chamber immediately above the surface of the bath, cooling means in said drawing chamber, means for drawing said glass sheet upwardly through said drawing chamber, a first pair of pipes within said chamber extending parallel to said sheet on the opposite sides thereof and spaced therefrom just above the bath surface, a second pair of pipes within said chamber extending at right angles to said sheet at the opposite edges thereof and spaced therefrom just above the bath surface, said pipes having apertures formed in their upper sides, and means for supplying gas to said pipes under pressure higher than that in the chamber so as to produce upwardly directed jets of gas through said apertures thereby creating an outer zone about said pipes of low pressure relative to an inner zone immediately adjacent said glass sheet at the same level, said zones being in open communication so that the difference in pressure tends to produce air currents flowing from said inner zone to said outer zone.

9. Apparatus for drawing glass in sheet form from a heated bath of molten glass comprising a sheet-forming frame located at the surface of the bath, through which the glass may be drawn, a drawing chamber immediately above the surface of the bath, cooling means in said drawing chamber, means for drawing said glass sheet upwardly through said frame and drawing chamber, a pair of pipes within said chamber and extending parallel to said sheet on the opposite sides thereof and spaced therefrom just above the bath surface, said pipes having apertures formed in their upper sides, all the apertures in the pipe on both sides of the glass sheet having their axes parallel to said sheet, the apertures in the pipe on one side having their axes inclined with respect to the vertical toward one end of the chamber and the apertures in the pipe on the opposite side of the glass sheet having their axes inclined toward the opposite end of the chamber, and means for supplying gas to said pipes under pressure higher than that in the chamber so as to produce upwardly directed jets of gas through said apertures thereby creating an outer zone about said pipes of low pressure relative to an inner zone immediately adjacent said glass sheet at the same level, said zones being in open communication so that the difference in pressure tends to produce air currents flowing from said inner zone to said outer zone.

10. Apparatus for drawing glass in sheet form from a heated bath of molten glass, comprising a sheet-forming frame located at the surface of the bath, through which the glass may be drawn, a drawing chamber immediately above the bath surface, cooling means in said drawing chamber, means for drawing said glass sheet upwardly through said frame and drawing chamber, a pair of pipes within said chamber extending parallel to said sheet on the opposite sides thereof and spaced therefrom just above the bath surface, said pipes having apertures formed in their upper sides, means for supplying gas to said pipes under pressure higher than that in the chamber so as to produce upwardly directed jets of gas through said apertures thereby creating an outer zone about said pipes of low pressure relative to an inner zone immediately adjacent said glass sheet at the same level, said zones being in open communication so that the difference in pressure tends to produce air currents flowing from said inner zone to said outer zone, and screens between said upwardly directed jets and said sheet, said screens having their lower edges above the bath surface to provide said open communication between said zones.

References Cited in the file of this patent

UNITED STATES PATENTS

| Number | Name | Date |
| --- | --- | --- |
| 1,816,037 | Zellers | July 28, 1931 |
| 2,158,669 | Amsler | May 16, 1939 |
| 2,287,136 | Rolland et al. | June 23, 1942 |
| 2,352,539 | Halbach et al | June 27, 1944 |
| 2,519,457 | Halbach et al. | Aug. 22, 1950 |
| 2,543,225 | Bonjour | Feb. 27, 1951 |

FOREIGN PATENTS

| Number | Country | Date |
| --- | --- | --- |
| 144,497 | Austria | Jan. 25, 1936 |
| 525,898 | Great Britain | Sept. 6, 1940 |
| 589,950 | Great Britain | July 3, 1947 |